US00RE35000E

United States Patent [19]

Aoyagi et al.

[11] E Patent Number: Re. 35,000

[45] Reissued Date of Patent: Jul. 25, 1995

[54] LIQUID OXYGENIC BLEACHING COMPOSITION

[76] Inventors: Muneo Aoyagi, 1-1, Minato, Wakayama-shi; Kazuhiro Takanashi, 4-12-906, Mutsumicho, Utsunomiya-shi Tochigi, both of Japan

[21] Appl. No.: 82,799

[22] Filed: Jun. 28, 1993

Related U.S. Patent Documents

Reissue of:

[64] Patent No.: 5,118,436
Issued: Jun. 2, 1992
Appl. No.: 618,970
Filed: Nov. 28, 1990

[30] Foreign Application Priority Data

Dec. 15, 1989 [JP] Japan ..... 1-325359

[51] Int. Cl.[6] ..... C11D 7/16; C11D 7/18; C11D 7/56; C11D 3/37

[52] U.S. Cl. ..... 252/99; 252/95; 252/102; 252/136; 252/531; 252/535; 252/539; 252/540; 252/547; 252/174.21; 252/174.24

[58] Field of Search ..... 252/95, 99, 100, 135, 252/136, 530, 531, 535, 539, 540, 559, 550, 594, 174.24, 174.21, 547, 102

[56] References Cited

U.S. PATENT DOCUMENTS

| | | | |
|---|---|---|---|
| 3,701,825 | 10/1972 | Radimer et al. | 423/273 |
| 3,779,931 | 12/1973 | Fries et al. | 252/95 |
| 4,079,015 | 3/1978 | Paucot et al. | 252/174.24 |
| 4,812,173 | 3/1989 | Tsao et al. | 134/27 |
| 4,935,065 | 6/1990 | Bull | 134/22.13 |
| 4,963,157 | 10/1990 | Machida et al. | 8/111 |

FOREIGN PATENT DOCUMENTS

| | | |
|---|---|---|
| 0087049 | 8/1983 | European Pat. Off. . |
| 0186990 | 7/1986 | European Pat. Off. . |
| 2024798 | 9/1970 | France . |
| 2111784 | 6/1972 | France . |
| 2303075 | 10/1976 | France . |
| 4007774 | 4/1940 | Japan . |
| 9052784 | 5/1974 | Japan . |
| 2103386 | 8/1977 | Japan . |
| 4010309 | 1/1979 | Japan . |
| 5076161 | 6/1980 | Japan . |
| 5108500 | 8/1980 | Japan . |
| 7154457 | 9/1982 | Japan . |
| 2185797 | 8/1987 | Japan . |
| 1234326 | 6/1971 | United Kingdom . |

OTHER PUBLICATIONS

European Search Report Application #EP 90124107 Dec. 4, 1991.

*Primary Examiner*—Paul Lieberman
*Assistant Examiner*—Erin M. Higgins
*Attorney, Agent, or Firm*—Birch, Stewart, Kolasch & Birch

[57] ABSTRACT

A liquid bleaching composition is acidic with a [PH] *pH* value of 1.5 to 6 and improved in stability. It comprises:

(a) 0.5 to 10% by weight of hydrogen peroxide,
(b) 0.1 to 20% by weight of an anionic surfactant,
(c) 0.1 to 20% by weight of a nonionic surfactant,
(d) 0.05 to 5% by weight of a polyacrylic acid having an average molecular weight of 1,000 to 100,000 or a salt thereof and/or a maleic polymer having an average molecular weight of 500 to 100,000, and
(e) 0.0001 to 1% by weight of a polyphosphoric acid, a salt thereof, an amino phosphonic acid, a salt thereof, or a diphosphonic acid or a salt thereof.

14 Claims, 1 Drawing Sheet

LIQUID OXYGENIC BLEACHING COMPOSITION

Matter enclosed in heavy brackets [ ] appears in the original patent but forms no part of this reissue specification; matter printed in italics indicates the additions made by reissue.

The present invention relates to an acidic liquid bleaching composition. In particular, the present invention relates to an acidic liquid bleaching composition having an excellent storage stability and high bleaching power.

Prior Art

Liquid bleaching agents based on hydrogen peroxide for clothes can be classified as either being alkaline or acidic.

The decomposition of hydrogen peroxide is accelerated under alkaline conditions and retarded under acidic conditions. Therefore, acidic bleaching agents have an insufficient storage stability at high temperatures, though they are relatively stable during the storage at low temperatures.

Investigations on the improvement of storage stability of liquid bleaching agents containing hydrogen peroxide have been made heretofore. For example, Japanese Patent Publication No. 77774/1965 discloses a weakly acidic liquid bleaching agent having excellent storage stability which comprises acidic sodium pyrophosphate, neutral sodium pyrophosphate and neutral potassium pyrophosphate. Japanese Patent Laid-Open No. 52784/1974 discloses a stable liquid bleaching agent comprising an organic acid selected from the group consisting of alkylidenediphosphonic acids, ethylenediaminetetraacetic acid, diethylenetriaminepentaacetic acid and nitrilotrimethylenephosphonic acid, a soluble tin salt and an ammonium salt and having a pH in the range of 0.5 to 7. Japanese Patent Laid-Open No. 103386/1977 discloses a hydrogen peroxide stabilizer comprising poly-α-hydroxyacrylic acid. Japanese Patent Laid-Open No. 10309/1979 discloses that a liquid prepared by adding water to a magnesium compound and an acid to conduct neutralization, thereby forming a hydrophilic complex inhibits the decomposition of hydrogen peroxide at pH 4 to 6. Japanese Patent Laid-Open No. 108500/1980 discloses a stable liquid bleaching agent having a pH of 1.8 to 5.5 which comprises an acid selected from the group consisting of organic acids, phosphoric acid and boric acid and a nitrogenous compound. Japanese Patent Laid-Open No. 76161/1980 discloses that when a poly-α-hydroxyacrylic salt is incorporated into an alkaline hydrogen peroxide bleaching agent containing a polyphosphoric salt as the stabilizer, a synergistic stabilization effect is exhibited. Japanese Patent Laid-Open No. 154457/1982 discloses a stabilizing assistant for a hydrogen peroxide bleaching agent which comprises a copolymer of acrylic acid and an acrylic ester and/or polyethylene glycol methacrylate. and Japanese Patent Laid-Open No. 185797/1987 discloses a stabilizer for a hydrogen peroxide bleaching agent which comprises a combination of a poly-α-hydroxyacrylic salt and an organic phosphonic salt.

The hydrogen peroxide bleaching agents containing the above-described stabilizers have defects that a high-temperature storage stability thereof is insufficent and that a sufficient bleaching effect cannot be obtained under acidic conditions.

SUMMARY OF THE INVENTION

After intensive investigations, the present inventors have found that an acidic hydrogen peroxide bleaching agent having a remarkably improved storage stability at high temperatures and high bleaching power can be obtained by incorporating a polyacrylic polymer and/or maleic polymer having a specified molecular weight surfactant. The present invention has been completed on the basis of this finding.

Thus the present invention provides a liquid oxygenic bleaching composition comprising:

(a) 0.5 to 10% by weight of hydrogen peroxide, (b) 0.1 to 20% by weight of an anionic surfactant, (c) 0.1 to 20% by weight of a nonionic surfactant, (d) 0.05 to 5% by weight of a polyacrylic acid having an average molecular weight of 1,000 to 100,000 or a salt thereof and/or a maleic polymer having an average molecular weight of 500 to 100,000, and (e) 0.0001 to 1% by weight of a polyphosphoric acid, a salt thereof, an amino phosphonic acid, a salt thereof, having the formula (I) or a diphosphonic acid or a salt thereof, having the formula (II):

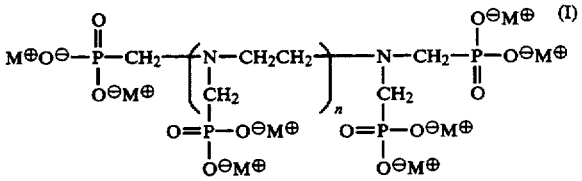

(I)

wherein n represents an integer of 0 to 5, and M⊕ represents H⊕ or an alkali metal ion,

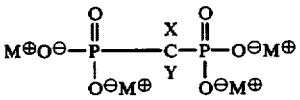

(II)

and wherein X is hydrogen or an alkyl having 1 to 4 [carbonation] *carbon atoms*, Y is hydrogen or an alkyl having 1 to 4 [carbonation] *carbon atoms* and M is hydrogen ion or an alkali metal ion, said composition having a pH value in the range of 1.5 to 6.

In the present invention, hydrogen peroxide (a) used as the bleaching base is incorporated into the composition in an amount of 0.5 to 10% by weight, preferably 3 to 7% by weight.

Examples of the anionic surfactant (b) used in the present invention include linear and branched alkylbenzenesulfonate salts, alkyl and alkenyl ether sulfate salts, alkyl- and alkenylsulfate salts, olefinsulfonate salts, alkanesulfonate salts and saturated and unsaturated fatty acid salts. Examples of the nonionic surfactant (c) include polyoxyalkylene alkyl and alkenyl ethers, polyoxyalkylene alkylphenyl ethers, higher fatty acid alkanolamides and alkylene oxide adducts thereof, sucrose fatty acid esters, fatty acid glycerol monoesters, alkylamine oxides, Pluronic surfactants, sorbitan fatty acid esters and ethylene oxide adducts thereof.

The sum of the anionic surfactant (b) and nonionic surfactant (c) in the composition is 0.1 to 20% by weight, preferably 3 to 15% by weight. The weight ratio of the component (b) to component (c) is 1/5 to 5/1, preferably [⅓] *1/3* to 3/1. Particularly preferred anionic surfactants (b) are linear alkyl ($C_8$ to $C_{18}$) benzenesulfonate salts, alkyl($C_8$ to $C_{18}$) ether (with the number of added ethylene molecules of 1 to 10) sulfate salts, α-olefin($C_{12}$ to $C_{18}$) sulfonate salts and alkyl($C_8$ to $C_{18}$) sulfate salts. Particularly preferred nonionic surfactants (c) are polyoxyethylene (with the molar number of addition of 1 to 30) alkyl ethers.

The polyacrylic acid or its salt used as the component (d) in the present invention is one having an average molecular weight of 1,000 to 100,000, preferably 2,000 to 20,000. When the average molecular weight is less than 1,000 or above 100,000, the stabilizing effect is rapidly reduced. Carbopol often used as a thickening agent for a liquid acidic hydrogen peroxide bleaching agent is a polyacrylic acid having a quite high molecular weight and partially crosslinked, which is different from the non-crosslinked polyacrylic acid used in the present invention.

Examples of the maleic polymer used as the component (d) include maleic homopolymers and copolymers of maleic acid with another vinyl monomer (including partially or completely neutralized salts of them). The copolymers include those of maleic acid with a vinyl monomer selected from the group consisting of, for example, acrylic acid, methyacrylic acid, acrylic esters, metacrylic esters and vinyl acetate. Among them, the copolymer of acrylic acid or methacrylic acid with maleic acid is preferred. The monomer ratio of maleic acid to the other monomer is preferably in the range of 90/10 to 40/60. The maleic polymers used herein are those having each an average molecular weight of 500 to 100,000, preferably 500 to 10,000 and particularly preferably 600 to 3,000. When the average molecular weight of the polymer is less than 500 or above 100,000, the stabilizing effect is rapidly reduced. The polymers (d) are incorporated into the composition in a total amount of 0.05 to 5% by weight, preferably 0.5 to 3% by weight. When the amount of the polymer is less than 0.05% by weight, no sufficient effect can be obtained and, on the contrary, when it exceeds 5% by weight, the polymer might cause phase separation.

The polyphosphoric acids and salts thereof herein used as the component (e) include pyrophosphoric acid, tripolyphosphoric acid, hexametaphosphoric acid and salts of them with sodium and potassium.

Particularly preferred examples of the amino phosphonic acids and salts thereof represented by the general formula (I) are those wherein n is 0 to 2. The salts of them include sodium and potassium salts. The component (e) is incorporated into the composition in an amount of 0.0001 to 1% by weight, preferably 0.001 to 0.1% by weight, and particularly preferably 0.001 to 0.05% by weight.

The composition of the present invention contains the balance of water in addition to the above-described components (a) to (e). If necessary, it may further contain an alcohol such as ethanol, isopropanol or ethylene glycol, as well as a thickening agent, flavor, dyestuff, fluorescent dye, enzyme, etc.

The pH of the stocks solution of the composition of the present invention is adjusted to 1.5 to 6, preferably 2.0 to 4.5 with an inorganic acid such as hydrochloric acid or sulfuric acid or an organic acid such as p-toluenesulfonic acid or citric acid. When the pH of the composition exceeds 6, the storage stability is seriously reduced.

In the invention, dyestuffs can be used with stability under the acidic condition. Organic pigments include color index vat blue 4, color index vat blue 6, color index pigment blue 22, color index vat red 23, color index pigment blue 15, color index pigment blue 17 and color index pigment green 36. Acidic dyestuffs include color index acid blue 229, color index acid blue 9, color index acid blue 112. Alizarine Fast Blue ERL (tradename of Yamada Chemical Co.). Alizarine Fast Blue 3GL (tradename of Yamada Chemical Co.) and Fastogen Blue 5380 (tradename of DIC Co.). Metal dyestuffs include color index acid read 198, color index acid blue 158, color index acid green 35, color index direct blue 86 and color index direct blue 199.

Figure 1:
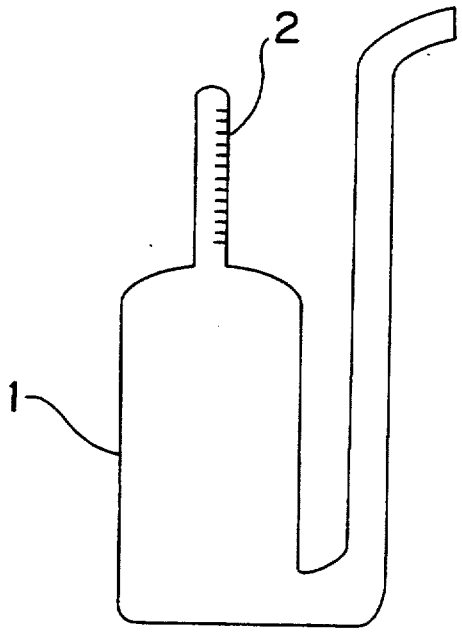
FIG. 1 is a diagram of a glass vessel used for determining the quantity of gas formed in the Examples.

1: glass vessel,

2: graduation (the gas can be determined in an amount of up to 100 ml).

EXAMPLES

The following Examples will further illustrate the present invention, which by no means limit the invention.

EXAMPLE 1

Bleaching compositions listed in Table 1 were prepared and subjected to the following tests:

(1) Storage stability (accelerated test):

0.5 ppm (in terms of iron ion) of ferric chloride was added to each of the bleaching compositions listed in Table 1. A 1-(glass vessel shown in FIG. 1 was filled with the mixture and immersed in a water bath at 70° C. for 30 h to determine the quantity of a gas thus generated.

(2) Bleaching rate:

Evaluation method:

Each of the bleaching agents having a composition as specified in Table 1 was dissolved in city water at 20° C. to prepare a solution having an available oxygen concentration of 0.05%. Five cloths stained with black tea prepared as will be described below were immersed in 300 m of each solution of the bleaching agent prepared as described above at 20° C. for 30 min, rinsed with city water, and dried. The bleaching rate was calculated according to the following equation:

$$\text{bleaching rate (\%)} = \frac{\text{(reflectivity after bleaching)} - \text{(reflectivity before bleaching)}}{\text{(reflectivity of white cloth)} - \text{(reflectivity before bleaching)}} \times 100$$

The reflectivity was determined with a colorimetric color difference Meter N-DR 101-DP, mfd. by Nihon Denshoku.

Cloths stained with black tea:

80 g of nitto black tea leaves (yellow package) was boiled in 3 1 of ion-exchanged water for about 15 min and then filtered through a desized bleached cotton cloth. A cotton shirting cloth #2003 was immersed in the filtrate and boiled for about 15 min. Thereafter, the liquid was left to cool for about 2 h. The cloth was naturally dried, washed with water until the was solution was no more colored, then dehydrated and pressed. It was cut into test pieces (8×8 cm) to be subjected to the tests.

The results are given in Table 1.

TABLE 1

| Composition (% by weight) | | Present invention 1 | 2 | 3 | 4 | Comparative 1 | 2 | 3 | 4 | 5 |
|---|---|---|---|---|---|---|---|---|---|---|
| Hydrogen peroxide | | 5 | 5 | 5 | 5 | 5 | 5 | 5 | 5 | 5 |
| Polyacrylic acid*1 | | 2 | | 1 | 1 | 2 | | | 2 | |
| Maleic acid/acrylic acid copolymer*2 | | | 2 | 1 | | | | | | |
| Polyoxyethylene alkyl ether*3 | | 4 | 5 | 3 | 4 | 4 | 3 | 4 | | 3 |
| Sodium linear alkylbenzenesulfonate*4 | | 7 | 4 | 5 | 5 | 7 | | 7 | | |
| Sodium tripolyphosphate | | 0.1 | | | | | | | | |
| Sodium hexametaphosphate | | | 0.01 | | | | | | | 0.1 |
| Sodium aminophosphonate*5 | | | | 0.01 | | | | | | |
| 1-hydroxyethylidene-1,1-diphosphonic acid*7 | | | | | 0.1 | | | | | |
| Ion-exchanged water | | B*6 | B | B | B | B | B | B | B | B |
| pH | | 2.8 | 2.5 | 3.0 | 3.0 | 2.6 | 2.4 | 2.5 | 2.4 | 2.4 |
| Storage stability | amount of gas formed (ml) | 2 | 3 | 2 | 2 | 56 | 65 | 53 | 57 | 30 |
| Bleaching rate (%) | | 11.5 | 11.2 | 11.3 | 11.3 | 10.0 | 5.3 | 6.0 | 7.3 | 7.0 |

(Notes)

*1polyacrylic acid: sodium salt having average molecular weight of 8.000.

*2maleic acid/acrylic acid copolymer: sodium salt having average molecular weight of 1.500.

*3polyoxyethylene alkyl ether: alkyl ($C_{12}$ to $C_{13}$) ethylene oxide (10 mol) adduct.

*4sodium linear alkylbenzenesulfonate: alkyl: $C_{12}$.

*5sodium aminophosphonate of the following formula:

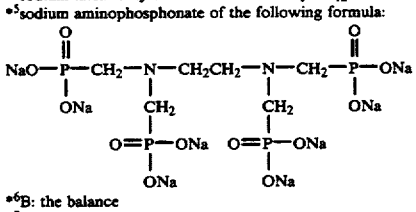

*6B: the balance

*7Dequest 2010 (tradename) being available from Monsanto, having the formula:

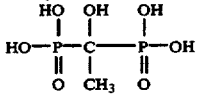

We claim:

1. A liquid oxygenic bleaching composition comprising:

(a) 0.5 to 10% by weight of hydrogen peroxide;

(b) 0.1 to 20% by weight of an anionic surfactant;

(c) 0.1 to 20% by weight of a nonionic surfactant;

(d) 0.5 to 5% by weight of a *polymer selected from the group consisting of a* polyacrylic acid having an average molecular weight of 1,000 to 100,000 or salt thereof [and/or], *a* maleic polymer having an average molecular weight of 500 to 100,000, *and mixtures thereof*; and (e) 0.0001 to 1% by weight of [a polyphosphonic] *an acid selected from the group consisting of (1) a polyphosphoric* acid, *or* a salt thereof[,]; *(2)* an amino phosphonic acid, *or* a salt thereof, having the formula (I):

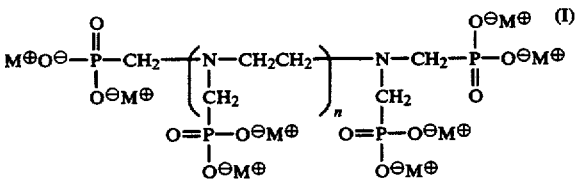

(I)

wherein n represents an integer of 0 to 5, and M⊕ represents H⊕ or an alkali metal ion; [or] *(3)* a diphosphonic acid or salt thereof having the formula (II)

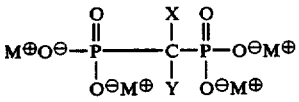

(II)

in which X is hydrogen or an alkyl having 1 to 4 carbon atoms, Y is hydrogen or an alkyl having 1 to 4 carbon atoms, and M⊕ is hydrogen ion or an alkali metal ion; *and (4)* a *diphosphonic acid or a salt thereof having the formula (III)*:

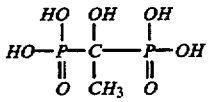

said composition having a pH value in the range of 1.5 to 6.

2. The liquid oxygenic bleaching composition according to claim 1, wherein the weight ratio of said anionic surfactant (b) to said nonionic surfactant (c) is 1/5 to 5/1 and the sum of said surfactants (b) and (c) is in the range of 0.1 to 20% by weight.

3. The liquid oxygenic bleaching composition according to claim 1 or 2, wherein said maleic polymer is a copolymer of acrylic or methacrylic acid with maleic acid.

4. The liquid oxygenic bleaching composition according to claim 1, wherein said hydrogen peroxide is present in an amount of 3 to 7% by weight of said composition.

5. The liquid oxygenic bleaching composition according to claim 1, wherein said anionic surfactant is selected from the group consisting of linear and branched alkylbenzenesulfonate salts, alkyl- and alkenyl-ether sulfate salts, alkyl- and alkenyl-sulfate salts, olefinsulfonate salts, alkanesulfonate salts and saturated and unsaturated fatty acid salts.

6. The liquid oxygenic bleaching composition according to claim 1, wherein said nonionic surfactant is selected from the group consisting of plyoxyalkylene alkyl and alkenyl ethers, polyoxyethylene alkylphenyl ethers, higher fatty acid alkanolamides an alkylene oxide adducts thereof, sucrose fatty acid esters, fatty acid glycerol monoesters, alkylamine oxides, pluronic surfactants, sorbitan fatty acid esters and ethylene oxides adducts thereof.

7. The liquid oxygenic bleaching composition according to claim 2, wherein the sum of said anionic surfactant (b) and said nonionic surfactant (c) is in the range of from 3 to 15% by weight.

8. The liquid oxygenic bleaching composition according to claim 2, wherein the weight ratio of said anionic surfactant (b) to said nonionic surfactant (c) is [½] *1/3* to 3/1.

9. The liquid oxygenic bleaching composition according to claim 5, wherein said anionic surfactant is a $C_8$–$C_{18}$linear alkyl benzenesulfonate salt, a $C_{8-18}$alkyl ether sulfate salt; a $C_{12}$–$C_{18}$ α-olefin sulfonate salt, or a $C_8$–$C_{18}$alkyl sulfate salt.

10. The liquid oxygenic bleaching composition according to claim 6, wherein said nonionic surfactant is a polyoxyethylene alkyl ether.

11. The liquid oxygenic bleaching composition according to claim 2, wherein said polyacrylic acid has an average molecular weight from 2,000 to 20,000.

12. The liquid oxygenic bleaching composition according to claim 2, wherein said maleic polymer has an average molecular weight of from 600 to 3,000.

*13. A liquid oxygenic bleaching composition comprising:*

*(a) 0.5 to 10% by weight of hydrogen peroxide;*

*(b) 0.1 to 20% by weight of an anionic surfactant;*

*(c) 0.1 to 20% by weight of an nonionic surfactant;*

*(d) 0.5 to 5% by weight of a polymer selected from the group consisting of a polyacrylic acid having an average molecular weight of 1,000 to 100,000 or salt thereof, maleic polymer having an average molecular weight of 500 to 100,000 and mixtures thereof; and*

*(e) 0.0001 to 1% by weight of a diphosphonic acid or salt thereof having the formula (III):*

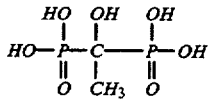

*, said composition having a pH value in the range of 1.5 to 6.*

*14. The liquid oxygenic bleaching composition according to claim 1, wherein said component (e) is*

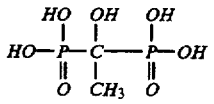

* * * * *